C. J. ALLEN AND J. MADER.
AGRICULTURAL IMPLEMENT.
APPLICATION FILED MAR. 26, 1920.
1,418,049.
Patented May 30, 1922.
3 SHEETS—SHEET 3.
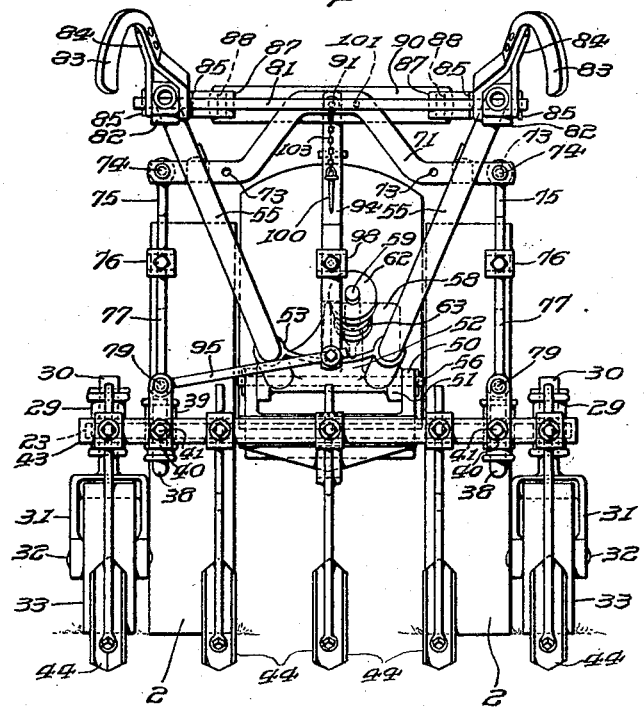
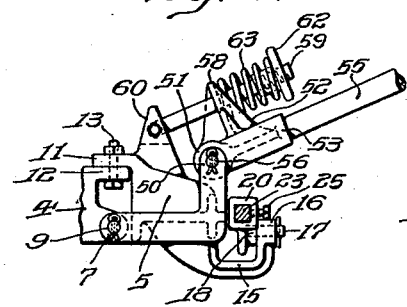
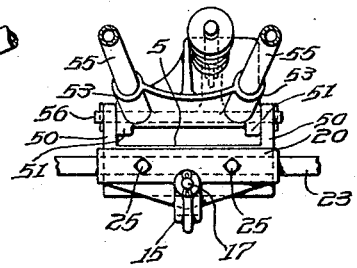
WITNESS
F. J. Hartman.
INVENTORS
Charles J. Allen,
Joseph Mader.
BY Blount, Moulton & Helbert
ATTORNEYS

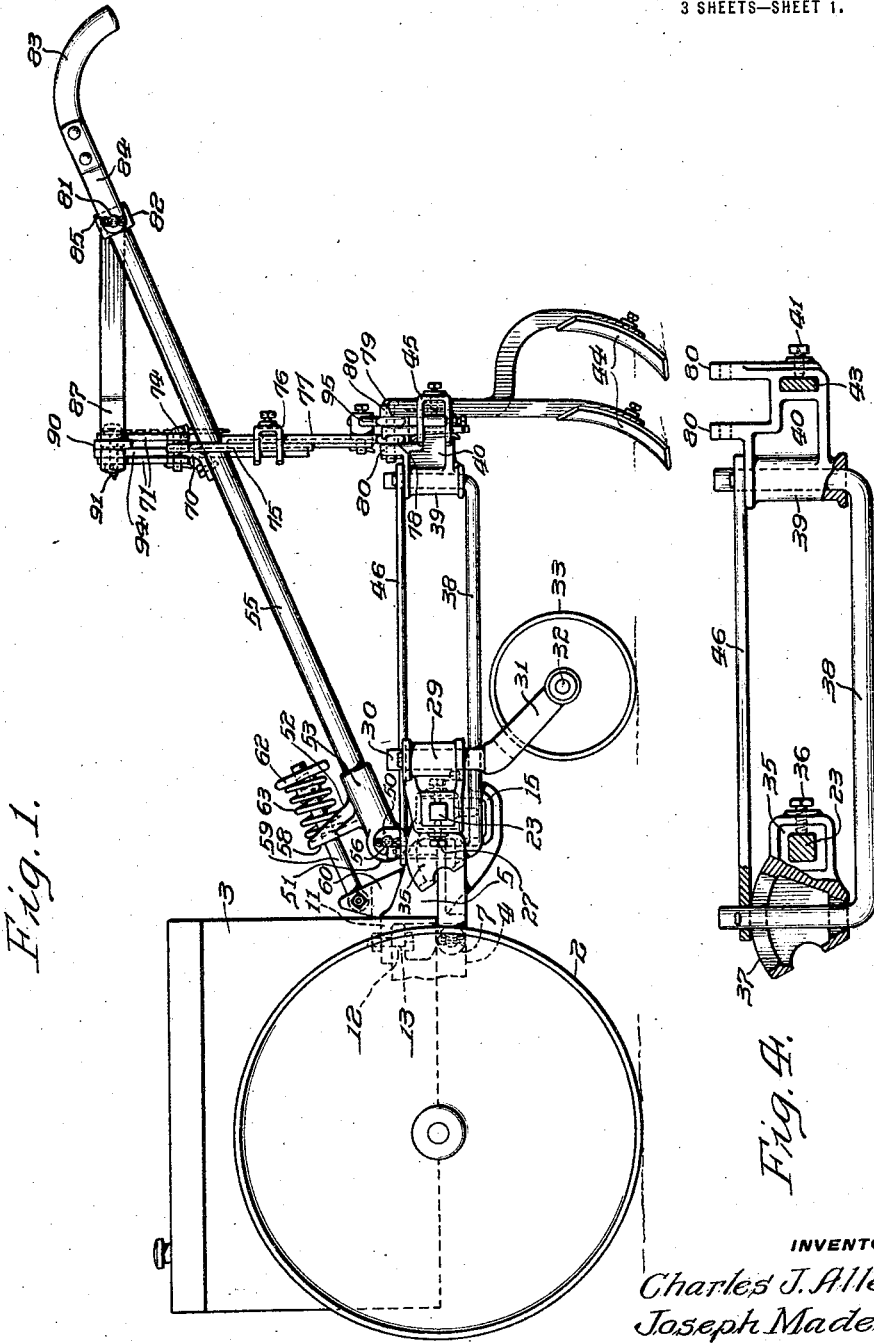

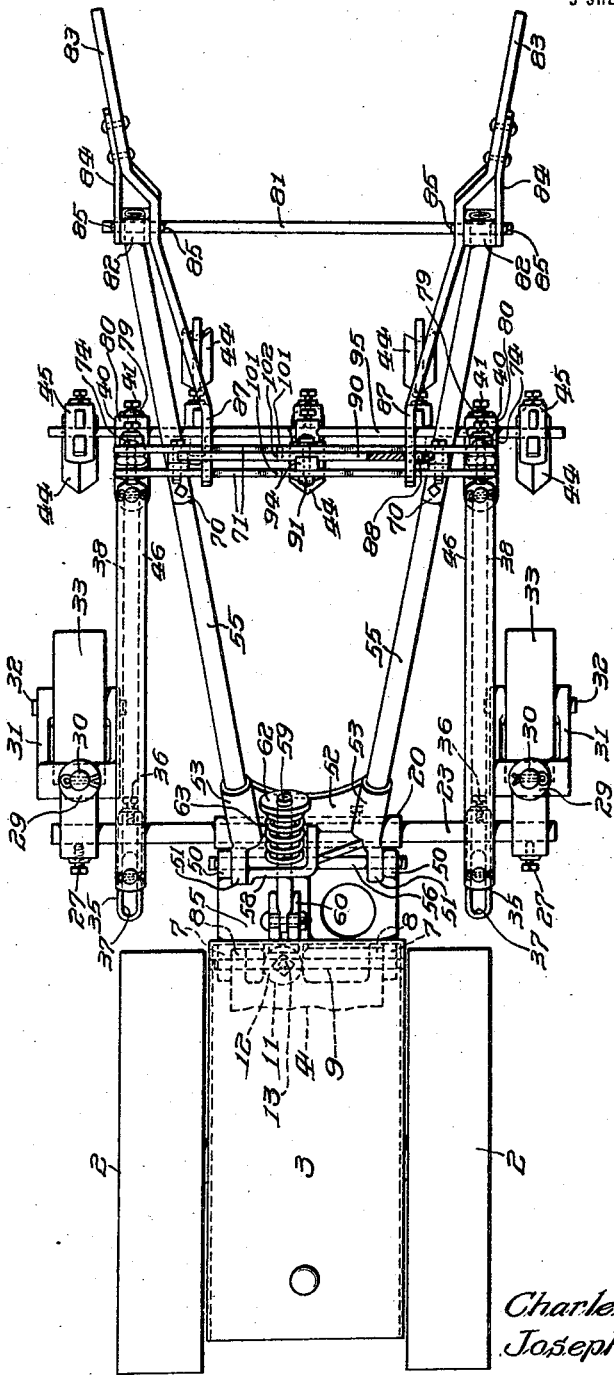

UNITED STATES PATENT OFFICE.

CHARLES J. ALLEN, OF MOORESTOWN, NEW JERSEY, AND JOSEPH MADER, OF PHILADELPHIA, PENNSYLVANIA, ASSIGNORS TO S. L. ALLEN & CO., INC., A CORPORATION OF PENNSYLVANIA.

AGRICULTURAL IMPLEMENT.

1,418,049.  Specification of Letters Patent.  Patented May 30, 1922.

Application filed March 26, 1920. Serial No. 368,342.

*To all whom it may concern:*

Be it known that we, CHARLES J. ALLEN, a citizen of the United States, and a resident of Moorestown, county of Burlington, and State of New Jersey, and JOSEPH MADER, a citizen of the United States, and a resident of Philadelphia, county of Philadelphia, and State of Pennsylvania, have invented certain new and useful Improvements in Agricultural Implements, of which the following is a specification, reference being had to the accompanying drawings.

Our invention relates to what are commonly known as garden tractors and more particularly to means for facilitating the use of such tractors in cultivating operations, in which it is found that in order to secure maximum efficiency of operation it is requisite to frequently shift the cultivator teeth laterally with respect to the general line of travel of the tractor and also to raise and lower the teeth vertically to enable them to be withdrawn from and returned to the soil.

The ordinary garden tractor comprises a frame supported on a pair of carrying wheels and serving to support a suitable motor or other means for delivering power to the wheels to propel them over the ground, the direction of travel being controlled through the medium of suitable steering handles by the operator who walks back of the machine, a suitable agricultural implement being arranged in the rear of the tractor to operate on the soil over which it passes, which implement in cultivating operations may conveniently comprise a plurality of substantially vertically positioned blades arranged to engage the soil in the vicinity of the rows of plants to be cultivated.

Among the principal objects of our invention are to provide means whereby a lateral movement of the cultivator blades may be readily effected which shall be simple in construction, not liable to get out of order, and which may be conveniently and successfully operated and adjusted by the ordinary farm hand. Further objects of our invention are to arrange the steering handles of a garden tractor in combination with means for effecting lateral and vertical movement of the cultivator teeth in such manner that the position of the operator's hands when grasping the handles will be a natural and easy one, so that the implement may be operated for relatively long periods of time without undue strain or fatigue and in such manner that both lateral and vertical movement of the cultivator teeth as well as the steering of the tractor may be effected by a simple and natural movement of the operator's hands and arms. Still further objects of the invention are to so arrange the various parts that they will be capable of suitable adjustment for bringing the teeth into proper position for cultivating rows of plants spaced at different widths and for positioning the teeth to effect any desired depth of engagement in the soil, and to provide means for effecting the foregoing objects which may be readily and conveniently adapted for use with different makes of garden tractors.

Our invention further includes all of the other various objects and novel features of construction and arrangement hereinafter more particularly pointed out or described.

In the accompanying drawings, we have illustrated a preferred embodiment of our invention and have shown the same in connection with a typical garden tractor, Fig. 1 being a side elevation; Fig. 2 a top plan view partially in fragmentary horizontal section; Fig. 3 a rear elevation; Fig. 4 an enlarged detailed view partially in section of a portion of the device, and Figs. 5 and 6 respectively a fragmentary side elevation and a fragmentary rear elevation of different parts illustrating details thereof.

Since the tractor itself may be of any suitable form, we have illustrated the same diagrammatically, showing only the carrying wheels 2 and the hood 3, beneath which, it will be understood, is located the motor and suitable connections therefrom for rotating the wheels, the motor being supported on a suitable frame 4, to which is preferably removably, yet rigidly secured a rearwardly projecting casting 5. In the form of the invention shown, this casting comprises a pair of vertically positioned and forwardly projecting ears 7 secured to suitable rearwardly projecting lugs 8 integral with the frame by a transversely extending bolt or pin 9, the casting being also provided with a forwardly projecting and horizontally positioned ear 11 overhanging a complementary lug 12 formed on the frame and secured thereto by a vertically extending bolt 13, but it will be understood that the means employed for fastening the casting 5 to the frame of the tractor will necessarily vary in accordance with the construction of the frame of the latter, and may therefore be modified as required with different makes of tractors.

The casting 5 is provided with a downwardly and rearwardly extending arm 15 which is directed upwardly at its rearward extremity to provide a boss 16 having a horizontally positioned aperture extending therethrough for the reception of a pivot pin 17 secured in a boss 18 integral with and depending from a sleeve 20, preferably rectangular in section and having a square or polygonal central aperture suitable for the reception of the wheel bar 23 which extends transversely of the machine and preferably projects for a considerable distance laterally beyond the carrying wheels 2, so that the sleeve 20 is supported, and in turn supports, the bar 23 in the rear of the casting 5 in such manner that these parts are operatively, unitarily rotatable in a vertical plane on the pin 17 with respect to casting 5. Suitable set screws 25 are arranged to extend through the sleeve for the purpose of securing it in fixed operative relation with the bar.

Encircling the bar 23 and arranged to be adjustably positioned thereon at any desired point by set screws 27 or other suitable means are a pair of rearwardly extending yokes each having a vertically extending boss 29 adapted to receive and support for vertical rotation therein a pin or kingbolt 30 carrying at its lower extremity a forked normally rearwardly directed arm 31 which serves to support the transversely extending axle 32 on which a caster wheel 33 is arranged to revolve, the construction being such that each caster wheel is capable of movement in any direction about the vertical axis of the kingbolt. Thus the caster wheels are free to follow irregularities of the ground in their movement thereover, the bar 23 rotating on its pivot to permit either wheel to rise or fall as may be necessary for this purpose.

Also adjustably mounted upon the bar 23 are a pair of draft rod guides 35 which may be secured at any desired point thereon by set screws 36 and each of which comprises a forwardly extending portion having a longitudinally positioned slot 37 which is wider in longitudinal direction at the top than at the bottom, as best shown in Fig. 4, and each of which is adapted to receive the forward upturned end of one of the draft rods 38. The rear upturned end of each of the draft rods extends through, and is rotatable in, a vertically positioned boss 39 of a hanger 40 adjustably clamped by set screws 41 to the transversely extending gang bar 43 which serves to support the cultivator blades 44, arranged to be adjustably positioned at any desired point on the gang bar by means of yokes 45 or in any other suitable manner as will be well understood by those familiar with the art. The upturned ends of each draft rod are adapted to receive the ends of a link 46 which rests on the upper surfaces of the boss 39 and guide 35.

A pair of rearwardly diverging steering posts are provided and secured in any suitable manner to the casting 5 in such a way as to maintain the bars in rigid relative relation while permitting them to be moved vertically with respect to the casting but not laterally with respect thereto. For so securing the bars the casting 5 may be conveniently provided with a pair of laterally spaced upwardly directed ears 50 adapted to cooperate with ears 51 formed on a casting 52 which is provided with rearwardly diverging sockets 53 for the reception of the forward ends of the steering posts 55, the casting 52 being secured in vertically movable relation with the ears 50 by means of a bolt or pin 56 extending through the said ears and the ears 51. It will be understood that the steering posts are operatively rigidly secured in the sockets, and means may preferably be provided for yieldingly supporting the weight of the posts which may comprise a bracket 58 integral with the casting 52 and projecting upwardly and outwardly substantially normal to the general direction of the sockets and provided with an aperture through which a bolt 59 pivoted in a lug 60 integral with the casting 5 is arranged to extend, the aperture being of sufficient size to afford some freedom of movement to the bolt. The outer end of the bolt is threaded for the reception of a flanged stop member 62 between which and the bracket 58 is positioned a coil spring 63, the whole arrangement being such that the posts 55 are yieldingly supported in a vertical plane through the medium of the spring and its attendant parts, the tension of the spring being readily adjustable by screwing member 62 in or out on the bolt.

Extending transversely of the steering posts and rigidly bolted or otherwise secured to clips 70 in turn secured to the posts are preferably a pair of substantially similar members 71, although a single member may be employed if desired, each of said members being conveniently formed from a piece of flat steel bar and adjacent each steering post extending in a substantially horizontal direction with its central portion between said horizontal portions substantially in the form of an upwardly directed blunt V, the apex of the V being approximately on the center line of the machine as best shown in Fig. 3. The exact shape and arrangement of these members, however, may be readily varied as desired. The members 71 are preferably spaced apart in longitudinal direction by suitable spacers and are provided with a plurality of apertures 73 adapted for the reception of hanger bolts 74, from which depend the hanger rods 75 preferably adjustably connected by adjusting clips 76 with upwardly extending hanger rods 77 provided with eyes 78 at their lower extremities adapted for the reception of horizontally positioned bolts 79 which extend through a pair of upwardly turned lugs 80 on each of the hanger brackets 40, the arrangement of the various parts just described being such that the gang bar 43 is adjustably suspended from the members 70 which, in turn, are rigidly secured to the steering posts, so that when the latter are lifted the gang bar will move in correspondence therewith.

Each of the steering posts carries a rearwardly projecting handle 83 preferably formed in a shape to be conveniently grasped by the operator, and a rod 81 extending transversely through the ends of the posts, which are preferably provided with preferably substantially rectangular bosses 82, serves as a pivot for the handles 83 which are preferably inwardly offset and bent to bring the portions thereof through which the rod passes in a plane substantially normal to its general direction so that the handles may be moved up and down in a substantially vertical plane. A keeper 84 is preferably attached to each of the handles, extends forwardly adjacent the boss and is provided with an aperture through which the rod 81 extends, cotter pins 85 serving to hold the latter from lateral movement. The handles extend forwardly from the rod and are directed inwardly and again forwardly so that their extremities 87 are substantially parallel with the center line of the machine, so as to pass conveniently through vertically disposed slots 88 formed adjacent the ends of a transversely extending member 90 which is positioned between the members 71 and pivoted to them at its center by a pivot bolt 91 passing through all of the said members. The slots 88 are of sufficient width to permit a certain amount of movement of the parts 87 therein in a transverse direction, but are preferably of substantially the same height as the said parts which are thus contained quite snugly between the upper and lower edges of the slots, and the adjacent edges of parts 87 are preferably slightly rounded so as to readily slide within the slots. Depending from the member 90 is an arm 94 secured thereto in any convenient manner to effect its unitary movement therewith, and extending from the lower end of the arm 94 is a substantially transversely disposed link 95 connected with one of the bolts 79 in any convenient way to permit relative movement between the parts. The arm 94 may preferably be formed of two relatively vertical movable parts operatively secured in adjusted relation by adjusting clip 98 so that the arm may be lengthened or shortened as desired.

With the various parts constructed and arranged substantially as hereinbefore described, it will be evident that the tractor may be guided by the operator in any desired direction by moving the handles 83 in a substantially horizontal plane, assuming the cultivator blades to be engaged in the soil, without effecting corresponding movement of the blades, the lower end of arm 94 remaining substantially stationary and the upper end moving either to the right or left, as the case may be, about its lower end as a substantially fixed center. Conversely, the gang bar carrying the blades may at any time be shifted laterally in either direction independently of the position of the tractor by depressing or raising either of the handles 83 with a corresponding movement of the other handle in the opposite direction, which serves to swing the member 90 about its pivot 91, which, under such conditions, remains substantially stationary, and in turn, through the movement of the arm 94 to pull or push the gang bar through the medium of link 95 either to the right or left for a distance depending on the amount of depression or elevation given to the handles, the lower end of arm 94 moving right or left as the case may be about its upper end as a substantially fixed center.

Furthermore, as the gang bar and its adjacent parts are suspended from the steering posts, the cultivator blades may be readily lifted out of the soil by merely lifting on the handles the draft rods in this operation moving forwardly in the slots 37, and as the various elements by which the gang bar is supported are preferably made adjustable, the bar may be suspended at any elevation requisite to effect the cultivating operation in the most satisfactory manner, while by reason of the arrangement of the draft rods and links 46 the gang bar is at all times maintained substantially at right angles to the general direction of the row being cultivated even though the bar has been shifted laterally to cause it to follow any slight deviation of the row or to move the blades out of contact with some obstruction in the soil.

Means may be provided for locking the member 90 to the members 71 in case it is at any time not desired to utilize the implement shifting mechanism, which means may conveniently consist of a pin 100 adapted for insertion through holes 101 in the members 71 and a corresponding hole 102 in the member 90, so that the pin when in position will lock the several members together and prevent any movement of member 90. The pin may be conveniently supported when not in use on a chain 103.

While we have herein described with some particularity a preferred embodiment of our invention and have illustrated the same in connection with a tractor having a pair of carrying wheels, we do not thereby desire or intend to limit ourselves to the precise details of arrangement and construction thereof which we have shown, as the same may be modified to meet particular conditions or to adapt the invention for use with different makes of tractors, as well as those having a single or a plurality of carrying wheels, as may be desired, and varying types of blades or other implements may be employed without departing from the spirit and scope of the invention, as defined in the appended claims.

Having thus described our invention, we claim and desire to protect by Letters Patent of the United States:

1. In a machine of the class described, the combination with a frame and carrying wheels therefor, of a pair of rearwardly diverging steering posts mounted for vertical movement on said frame, a gang bar carrying soil working implements, means for suspending said gang bar from said posts, and means comprising vertically moveable handles relatively moveable with respect to and supported by said posts operative to shift said gang bar laterally.

2. In a machine of the class described, the combination with a frame and carrying wheels therefor, of a pair of rearwardly diverging steering posts, a gang bar, means for suspending said gang bar from said posts, a plurality of vertically moveable handles pivoted adjacent said posts, and means connecting said gang bar with said handles whereby the movement of said handles relatively to said posts is operative to shift said gang bar laterally.

3. In a machine of the class described, the combination with a frame and carrying wheels therefor, of a member moveable vertically with respect to said frame, steering posts rigid with said member, steering handles relatively moveable with respect to said posts, a ground working implement, and means operative to cause lateral movement of said implement in correspondence with the movement of said handles relatively to said posts.

4. In a machine of the class described, the combination with a frame and carrying wheels therefor, of a pair of steering posts moveable vertically with respect to said frame, means for yieldingly supporting said posts, a ground working implement, means for suspending said implement from said posts, means for connecting said frame with said implement to impart draft thereto, steering handles supported by said posts and relatively moveable with respect thereto, and means whereby the movement of said handles is operative to cause lateral movement of said ground working implement.

5. In a machine of the class described, the combination with a frame and carrying wheels therefor, of a pair of rearwardly diverging steering posts vertically moveable with respect to said frame, a ground working implement, a pair of draft bars extending rearwardly from said frame to said implement and capable of movement with respect to said frame, a pair of steering handles supported by said posts and vertically moveable with respect thereto, and means independent of said posts interposed between said handles and said implement operative to effect a lateral movement of said implement in correspondence with the movement of said handles with respect to said posts.

6. In a machine of the class described, the combination with a frame and carrying wheels therefor, of a pair of rearwardly diverging steering posts in relatively rigid relation, a ground working implement, means for supporting said implement from said posts, a draft bar extending rearwardly from said frame to said implement and moveable with respect to said frame and said implement, a steering handle supported adjacent the end of each of said posts and moveable in a vertical plane with respect thereto, and means interposed between said handles and said implement operative to cause lateral shifting of said implement in correspondence with the movement of said handles.

7. In a machine of the class described the combination with a frame and carrying wheel supported therefrom, of a pair of rearwardly diverging steering posts mounted for vertical movement with respect to said frame, a ground working implement, draft means extending between said frame and said implement, handles moveable on a horizontal axis and extending rearwardly from said posts, and means independent of said posts interposed between said handles and said implement for shifting said implement laterally in correspondence with the movement of said handles.

8. In a machine of the class described, the combination with a frame, and carrying wheels, of a pair of rearwardly diverging steering posts in operatively rigid relation with each other, a ground working implement, draft means extending between said frame and said implement, a member secured to and extending transversely of said posts, a member pivoted to said first mentioned member and having a depending arm, a link extending between said arm and said implement, and means cooperative with said posts and moveable in a vertical plane operative to cause the actuation of said last mentioned member.

9. In a machine of the class described the combination with a frame, and carrying wheels, of a pair of rearwardly diverging relatively stationary steering posts mounted for vertical movement with respect to said frame, a ground working implement, draft means extending between said frame and said implement, a handle supported adjacent each of said posts and moveable on a horizontal axis with respect thereto, a member extending transversely of and secured to said posts, a member pivoted to said first mentioned member and having an arm, and connecting means between said arm and said implement, said handle cooperating with said last mentioned member to move said connecting means to shift said ground working implement laterally.

10. The combination with a tractor having a frame, a carrying wheel and a motor, of a ground working implement, a plurality of draft means connecting said implement with said tractor said means operating in parallelism, steering posts mounted for vertical movement with respect to said frame, handles mounted for vertical movement with respect to said posts, and means interposed between said handles and said implement operative to shift said implement laterally in correspondence with the vertical movement of said handles.

11. In a machine of the class described, the combination with a frame and carrying wheels therefor, of a pair of relatively fixed steering posts, a handle supported by and relatively movable with respect to each post, a gang bar, means for suspending the gang bar from the posts, and means interposed between the gang bar and said handles operative to shift the gang bar laterally in correspondence with the movement of the handles.

12. In a machine of the class described, the combination with a frame and carrying wheels therefor, of a steering post, a handle supported by and relatively vertically movable with respect to the post, a gang bar supported beneath the post and means interposed between the gang bar and said handle operative to shift the gang bar laterally in correspondence with the movement of said handle.

13. In a cultivator comprising a wheeled frame, a pair of arms secured to said frame and extending rearwardly therefrom, a pair of handle members pivoted to said arms on horizontal pivots and adapted to form guiding means for said frame when moved laterally to one side or the other, a tool bar, and means connecting said handles and tool bar so that the tool bar will be moved to one side or the other when the said handles are swung vertically on their pivots.

In witness whereof, we have hereunto set our hands this 24th day of March, 1920.

CHARLES J. ALLEN.
JOSEPH MADER.